Oct. 16, 1962  J. O. GUSTAVSSON  3,058,379
PLATE SHEARING MACHINES
Filed Nov. 19, 1957

United States Patent Office

3,058,379
Patented Oct. 16, 1962

3,058,379
PLATE SHEARING MACHINES
John Olov Gustavsson, Goteborg, Sweden, assignor to Aktiebolaget Svetsmekano, Goteborg, Sweden, a corporation of Sweden
Filed Nov. 19, 1957, Ser. No. 697,412
Claims priority, application Sweden Nov. 27, 1956
2 Claims. (Cl. 83—314)

The invention relates to such plate shearing machines wherein the plate is machined between two tools, of which at least one has an oscillating operation movement. In machines of this kind previously known the feeding of the plate between working strokes takes place either by hand or automatically by means of a special device. The present invention has for its object to accomplish an automatic feeding of the plate by means of the tools themselves.

The invention is substantially characterized in that the tools by engaging the plate cause a simultaneous machining and step-by-step feeding of the plate. The operational mechanism of the tools is then of such a nature that the oscillating tool during each working cycle makes a curve shaped movement composed of one motion component directed perpendicularly to the plate and one directed parallelly to the plate, while the other tool is movable substantially only parallelly to the plate. In such a device the oscillating tool preferably is the driving tool, while the other tool is arranged to be carried forward in the feeding direction by the plate.

The invention is primarily intended to be used in plate shearing machines but it can also be applied to other types of plate machining devices.

The invention is illustrated in the attached drawings, which show various embodiments of a device according to the invention applied to plate shearing machines.

Figure 1:
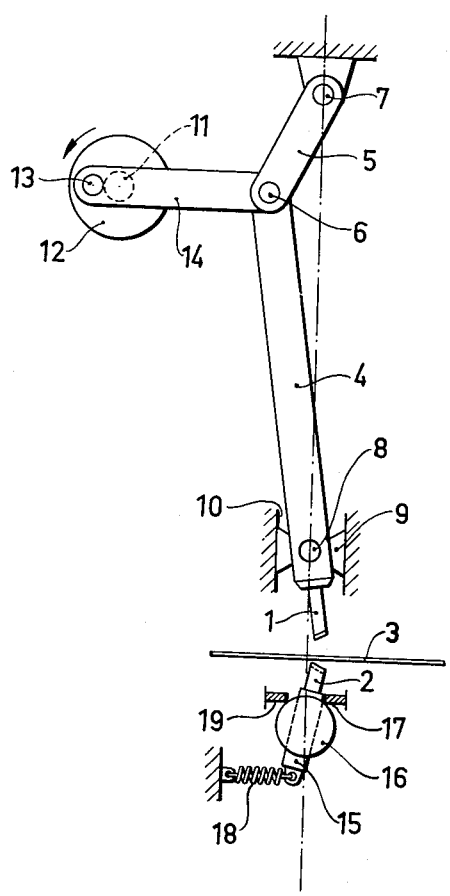
Figure 3:
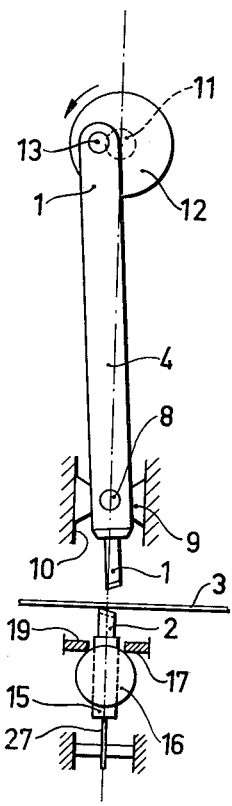
Figure 2:
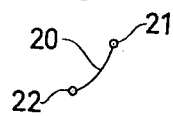
Figure 4:
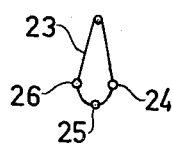

FIGURE 1 is a diagrammatic illustration of the tools and the operating mechanism belonging to the same. FIGURE 2 shows on a larger scale the motion path of a point on the edge of the upper shearing tool. FIGURE 3 shows in a similar way another embodiment of the operating mechanism, and FIGURE 4 shows on a larger scale the motion path of a point on the edge of the upper shearing tool.

In all embodiments shown the two tools 1 and 2 are arranged one above the other on either side of the operation position of the plate 3. The upper tool 1 is attached in a holder 4 which in the embodiment illustrated forms the one link of a double-armed toggle device, the other link 5 of which being pivotably connected on one side with the link 4 by means of a pin 6 and on the other pivotably carried on a fixed pin 7. By means of a pin 8 the link 4 is pivotably connected to a sliding block 9 which is rectilinearly guided vertically in a guide way 10. The toggle device is arranged to be actuated by means of a continuously rotating motor driven shaft 11 by way of a crank disc 12, a crank pin 13 attached to the disc and a connecting rod 14. In the drawing the toggle device is shown in its left outer position. The crank motion is adjusted in such a way that the two links 4, 5 in the other position will lie in line in a vertical plane.

The lower shearing tool 2 is attached in a holder 15 which in turn is secured to a shaft 16 which is rotatable in fixed bearings about an axis parallel to the plate and right angled to the feeding direction of the plate. The tool holder 15 is normally held in engagement with a shoulder 17 by means of a spring 18. The motion of the tool holder is restricted by a shoulder 19 disposed on the opposite side. Both shoulders are suitably adjustable for varying the initial position of the tool and the magnitude of its angular motion.

When the crank shaft 11 rotates an oscillating movement is imparted to the upper tool 1 along a path 20 having the curve shape shown in FIG. 2, the edge of the tool moving between the points denoted with 21 and 22. This movement is composed of one motion component directed perpendicularly to the plate and one directed parallelly to the same. The arrangement is such that the upper tool will engage the plate at a point right opposite to the lower tool being in its right end position. The two shearing tools, which have parallelepipedon shape, are provided with a bevelled end face forming an edge with one of the side faces. The two tools are displaced in relationship to one another so that both edges lie in a common shearing plane. The edges form an angle with the longitudinal direction of the tools so that they converge towards one another in the feeding direction of the plate during the shearing. When the upper tool makes contact with the plate with its pointed end, the plate is pinched between the upper and the lower tool which results in that the plate is sheared during the continued movement and at the same time is fed on together with the tool. By the engagement with the plate the lower tool will then be carried forward in the feeding direction in opposition to the spring 18. When the shaft 11 has rotated half a revolution the link pins 6, 7, 8 lie in the same vertical plane which thus represents the left outer position 22 of the tools. In a continued rotation of the shaft 11, the tool 1 returns to the initial position 21, the engagement with the plate then ceases and the lower tool is restored to its initial position by the spring 18. During the return motion the plate remains in the position to which it has been brought. In this way the plate will be fed on one step for each working cycle during a simultaneous shearing of the plate in a continuous cut.

In the embodiment shown in FIG. 3 the tool holder 4 is adapted to perform a connecting rod motion and for this purpose it is connected to the driving shaft 11 by means of a disc 12 and a crank pin 13 attached to the disc. Then each point on the edge of the lower tool will describe a closed curve 23 having the shape shown in FIG. 4. The upper tool makes contact with the plate at the point 24 on the curve and has completed substantially the shearing phase at the point 25. At point 26 the tool has completely left the plate. The plate will thus be fed to that position wherein the upper tool releases the plate. During the feeding the lower tool is carried forward by the engagement with the plate in opposition to the spring 27, which in this case consists of a leaf spring 27 secured to the holder 15. In this case it is assumed that the tool in its initial position is located in a central position approximately in the vertical plane through the pin 8 and that the tool thus will move between this central position and an end position adjacent the left shoulder 19.

What is claimed is:
1. A plate shearing machine comprising, in combination, upper and lower cooperating cutting tools movably mounted on opposite sides of the path of movement of the plate, and movable in planes parallel with the feeding direction of the plate, both of said tools being parallelepipedal and both of said tools having rectilinear cutting edges, means for positively operating the upper tool to undergo a translatory oscillating movement wherein the axis about which the upper tool oscillates is translated transverse of the path of movement of the plate, said tool being actuated to engage the plate intermittenly and thereby impart a step-by-step feeding motion to the plate, and the lower tool being swingable about an axis perpendicular to the feeding direction of the plate and being dis- posed to undergo an oscillating movement in one direction from an initial position by being driven indirectly from the upper tool by the action of the plate pressed into engagement with said lower tool in response to the action of the upper tool, both of said tools being swingable in the direction of the rectilinear cutting edges of the tools and the leading portions of the cutting edges of both the upper and lower tools in the direction of work feed being disposed closer together than the other portions of the tools, and a spring to cause said lower tool to oscillate in the opposite direction to restore said lower tool to its initial position.

2. A plate shearing machine as defined in claim 1, wherein adjustable shoulders are provided to limit the oscillating movement of the lower tool.

References Cited in the file of this patent

UNITED STATES PATENTS

| | | |
|---|---|---|
| 249,713 | Wiggin | Nov. 15, 1881 |
| 1,082,518 | Hausman | Dec. 30, 1913 |
| 1,174,041 | Bardet | Mar. 7, 1916 |
| 1,417,609 | Koerner | May 30, 1922 |
| 1,531,403 | Koerner | Mar. 31, 1925 |
| 2,051,453 | Mactaggart | Aug. 18, 1936 |
| 2,136,210 | Hall | Nov. 8, 1938 |
| 2,504,035 | Morgan | Apr. 11, 1950 |
| 2,551,335 | Piazze | May 1, 1951 |
| 2,627,923 | Duncan | Feb. 10, 1953 |

FOREIGN PATENTS

| | | |
|---|---|---|
| 498,021 | Germany | May 16, 1930 |